United States Patent [19]

Amico

[11] 4,158,983

[45] Jun. 26, 1979

[54] ANCHOR BOLT ASSEMBLY

[76] Inventor: Peter J. Amico, 4854 Glenfield Dr., Syracuse, N.Y. 13215

[21] Appl. No.: 835,245

[22] Filed: Sep. 21, 1977

[51] Int. Cl.² .............................................. F16B 13/10
[52] U.S. Cl. ........................................ 85/76; 85/87; 403/349; 403/369
[58] Field of Search ................... 85/66, 89, 71, 73, 74, 85/75, 76, 77, 98, 86, 87, 88; 403/349, 369; 61/45 B; 220/301, 302

[56] References Cited

U.S. PATENT DOCUMENTS

| 610,308 | 9/1898 | Seaman et al. ............................. 85/74 |
| 703,796 | 7/1902 | Lakhousky ................................ 85/73 |
| 839,705 | 12/1906 | Bennett ..................................... 85/75 |
| 1,352,494 | 9/1920 | Zifferer ..................................... 85/72 |
| 1,417,209 | 5/1922 | Sherwood ................................. 85/87 |
| 1,487,291 | 3/1924 | Tomkinson ............................... 85/87 |
| 1,932,099 | 10/1933 | Cabana ............................. 403/349 X |
| 2,783,673 | 3/1957 | Lewis et al. ............................... 85/75 |
| 3,000,254 | 9/1961 | Hottenstein .............................. 85/75 |
| 3,478,302 | 11/1969 | Chirumbolo ...................... 403/349 X |
| 3,941,028 | 3/1976 | Lobello et al. ...................... 85/87 X |

FOREIGN PATENT DOCUMENTS

| 627122 | 9/1961 | Canada ......................................... 85/73 |
| 441641 | 5/1912 | France ......................................... 85/87 |
| 454771 | 2/1950 | Italy ............................................. 85/73 |
| 21935 | 7/1900 | Switzerland .............................. 220/301 |
| 1353559 | 5/1974 | United Kingdom ........................ 85/87 |

*Primary Examiner*—Thomas J. Holko
*Attorney, Agent, or Firm*—Bruns & Jenney

[57] ABSTRACT

An expansion anchor assembly having a segmented expansion shell containing two or more sections that are joined in assembly at the base of the shell. The base sections are interlocked along abutting radially extended side walls. An end cap is passed over the bottom of the base and securely locked to each section to close the assembly and hold the base immobile as the leaves of the shell are expanded outwardly.

8 Claims, 5 Drawing Figures

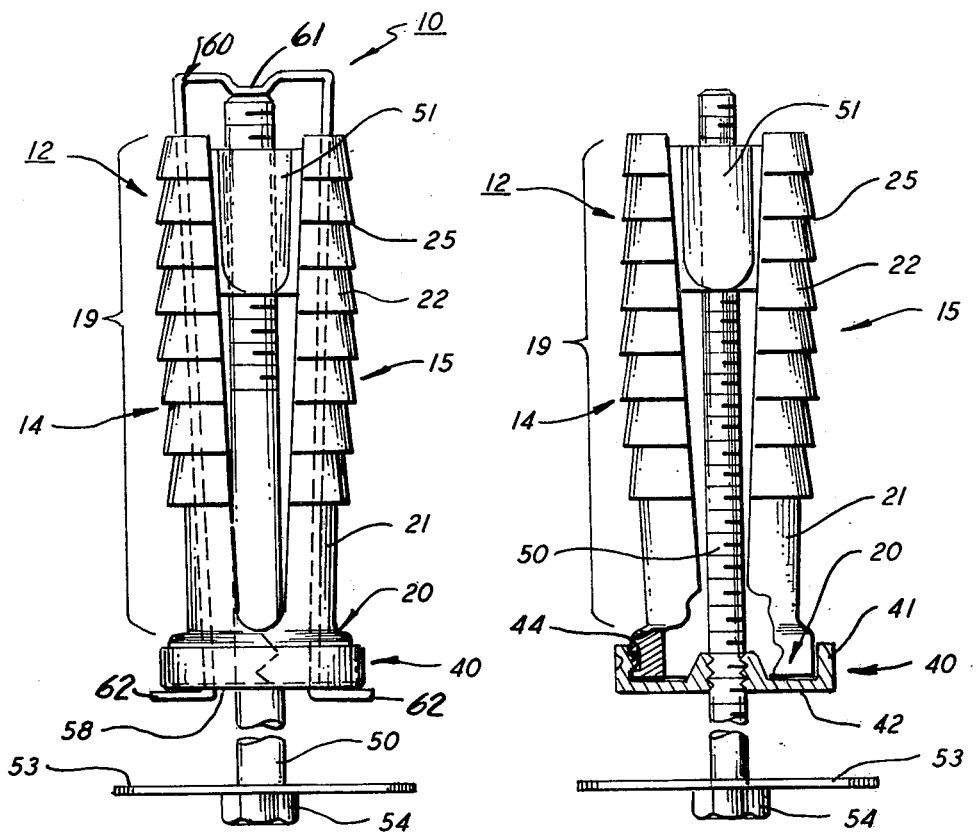
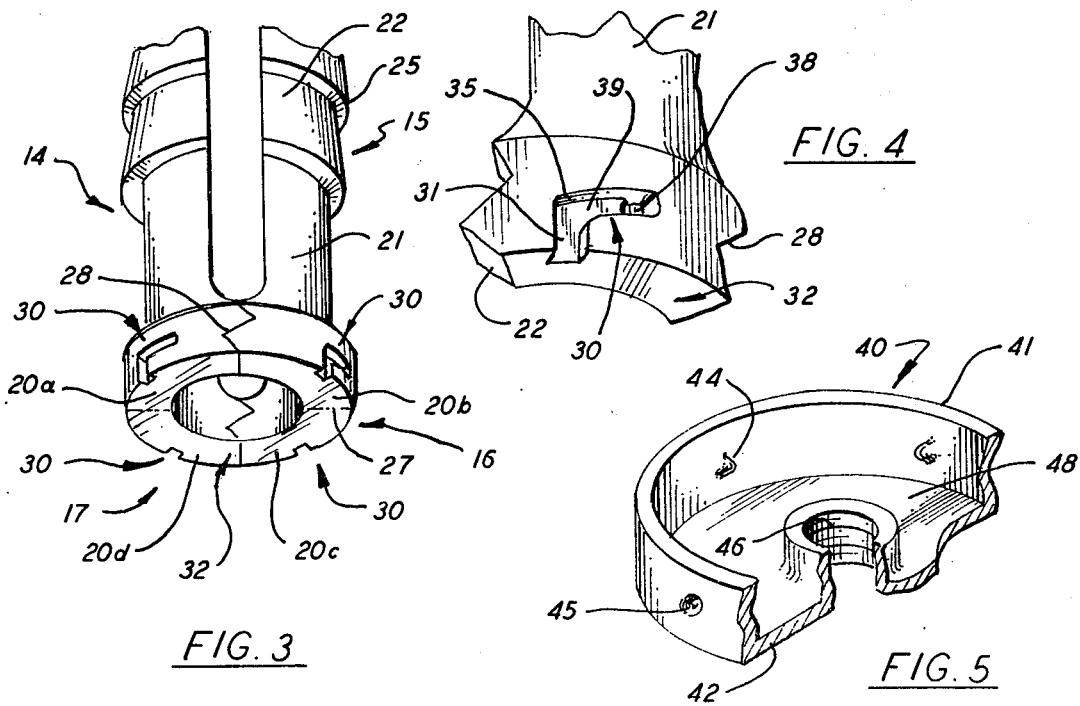

ANCHOR BOLT ASSEMBLY

BACKGROUND OF THE INVENTION

This invention relates to an improved expansion anchor bolt assembly and, in particular, to an expansion anchor bolt assembly utilizing a segmented expansion shell that generally exhibits the holding characteristics of a more costly single piece unit.

Anchor bolt assemblies of this type are used in a wide range of applications. The most important application, however, is the area of mine safety where the expansion device is employed to help support the roof of the mine. Typically, a hole is drilled or bored upwardly through the ceiling of the mine shaft into the overhead stratum. An elongated bolt, containing a plate at the head end and an expansion anchor assembly at the thread end, is passed upwardly into the opening. A wedge, contained in the expansion anchor assembly, is drawn down into the anchor assembly by turning the bolt. This, in turn, forces a number of finger-like elements to be expanded outwardly into holding contact against the wall of the opening and also draws the plate against the mine shaft roof. Further torquing of the bolt stresses the overhead formation of earth and rock to prevent it from moving and thus creating a potentially dangerous situation.

Heretofore, it had been preferred to construct the expansion shell of the anchor from a single piece of generally malleable metal. In form, the shell conventionally includes an annular base section having a plurality of finger-like elements axially extended from the top surface thereof. The single piece base provides a foundation of considerable strength about which the relatively weaker fingrs deform as the wedge is drawn into the anchor assembly. As a result, the fingers move uniformly in an outward direction to provide for a parallel expansion of the shell members. It is well known in the art that this type of expansion delivers the greatest possible holding power and anything less will reduce the stressing ability of the assembly. The main disadvantage of the single piece shell relates to the high cost of producing this relatively intricate structure and the excessive scrap rate associated therewith.

Attempts have been made, with varying degrees of success, to fabricate expansion shells in two or more parts which can be more conveniently and economically formed by well known casting, stamping and/or forging techniques. Bringing the parts together in assembly and properly supporting the parts during the expansion process has long been a problem in the art.

A two or four leaf bail assembly is probably the most common type of segmented expansion shell device that is used in industry today. In this arrangement, two shell segments are generally joined together by a bail or strap by staking or welding the strap to the top section of each segment. In operation, a draw bolt acts between the strap and a wedge to force the wedge downwardly against the shell fingers. The shell is permitted to open at the bottom with each segment being deformed outwardly about the relatively thin strap. Any small resistance to the movement of one or both segments is immediately translated to the weaker strap, causing it to twist and/or bend in an unpredictable manner. As a result, parallel expansion of the shell segments cannot be maintained and less than optimum anchoring is delivered.

Another common anchor arrangement involves joining two or more shell segments at the base of the shell by means of a clip-on "pal nut" that is formed from a thin sheet metal stamping. A threaded opening is provided in the stamping through which the draw bolt is turned into threaded engagement with the wedge. In practice, the bolt acts between the two threaded members to pull the wedge down into deforming contact against the shell fingers. Here again, the clip-on nut represents the weak element in the system and, as the wedge descends, the clip will usually release prematurely thereby allowing the shell components to be forced out of their original optimum operational position. As a consequence less than maximum performance is produced by the assembly. A clip-on device of the type noted is described in further detail in U.S. Pat. No. 3,941,028.

Both the bail and clip-on nut mechanisms perform quite well in holding the expansion device together in assembly. They also provide a convenient means for allowing the wedge to move into operation against the fingers. However, in both arrangements, the retaining element forms a weak section in the assembly which usually deforms prematurely under stress thereby causing the anchor to fail or deliver less than the desired holding power.

SUMMARY OF THE INVENTION

It is therefore an object of the present invention to improve expandable anchor bolt assemblies.

A further object of the present invention is to secure a segmented expansion shell in assembly in such a manner that the base of the shell is prevented from moving as the fingers of the shell are expanded outwardly.

A still further object of the present invention is to provide a segmented expansion shell, suitable for use in a mine bolt assembly, that is able to deliver the performance characteristics of a single piece shell.

Another object of the present invention is to reduce the cost of an expansion anchor assembly without sacrificing the strength of the device.

These and other objects of the present invention are attained by means of an expansion anchor bolt assembly including a segmented expansion shell containing a cylindrical base made up of arcuate shaped sections that are interlocked along their abutting sidewalls and an end cap that is passed over the bottom of the base in close sliding relationship therewith, the cap having means associated therewith for securing each base section in locking engagement in assembly so that the base of the shell is held immobile as the leaves of the shell are driven outwardly by a wedge during the expansion process.

BRIEF DESCRIPTION OF THE DRAWINGS

For a better understanding of the present invention as well as other objects and further features thereof, reference is had to the following detailed description of the invention to be read in conjunction with the accompanying drawings, wherein:

FIG. 1 is a side elevation of an expansion anchor bolt assembly embodying the teachings of the present invention in which the draw bolt acts against a strap to drive a wedge downwardly into a segmented expansion shell;

FIG. 2 is also a side elevation of an expansion anchor bolt assembly embodying the teachings of the present invention in which the draw bolt acts between a threaded end cap and a wedge to draw the wedge down into a segmented expansion shell;

FIG. 3 is an enlarged partial view in perspective showing the base of the segmented expansion shell employed in FIGS. 1 and 2;

FIG. 4 is a partial view in perspective showing one arcuate shaped base section of the shell illustrated in FIG. 3; and FIG. 5 is a partial perspective view of the end cap employed in the assembly of FIG. 1 which is employed to secure the anchor bolt components in assembly.

DESCRIPTION OF THE PREFERRED EMBODIMENT

Referring initially to FIGS. 1 and 3, there is shown an expansion bolt assembly, generally referenced 10, containing an expansion shell 12 that includes four quarter segments 14-17. The segments are brought together in assembly to provide a cylindrical base 20 having a plurality of finger-like elements depending outwardly from the top surface thereof in an axial direction. Each segment further includes an arcuate shaped base section 20a-20d having one or more fingers 19 depending therefrom. As is typical, the finger sections have a stem 21 affixed to the base section and a leaf 22 at the terminal end comprised of a number of teeth 25 that are for gripping earth and rock when the shell is expanded within a hole bored or drilled into a mine shaft roof. Although the present shell is herein depicted as being formed of four independent quarter sections, it is well within the scope of the present invention to utilize more or less shell segments provided that the segments can be simply formed by any well-known forming process and are brought together in a manner which will be explained in greater detail below.

As best illustrated in FIG. 3, each of the arcuate base sections carried by the individual segments contains a radially extended sidewall 27 that has a sawtooth configuration 28. The sidewall of each base section compliments that of the next adjacent section so that when assembled, the base sections interlock to prevent the segments from moving inwardly in a radial direction or slipping over each other in an axial direction.

Each base section also contains a locking groove, generally referenced 30. As illustrated in greater detail in FIG. 4, each groove has an entrance passage 31 beginning at the bottom surface 32 of the base and extending upwardly in an axial direction for a short distance. The entrance passage is then joined by a second circumferentially extending passage 35 that describes a portion of an upwardly directed spiral or helix.

In assembly, an end cap 40 (FIG. 5) is passed over the bottom of the shell base 20. The end cap includes an annular side wall 41 and a cylindrical end wall 42. The cap typically is cast or machined from 0.060 inch thick steel with its inner diameter providing a close running fit with the outside diameter of the shell base. A plurality of dimple-like, inwardly directed, protrusions 44 are formed on the inner side wall of the cap, the number of protrusions being equal to the number of locking grooves formed in the base 20. The protrusions are circumferentially spaced about the side wall of the cap so that they are slidably receivable within the entrance grooves contained in the base. The cap can thus be conveniently slipped over the base. Upon reaching the bottom of the entrance grooves, the protrusions are directed laterally into spiral passages 35. As the protrusions on the cap move up the spiral passages, the inside end wall 48 of the cap is drawn into seating contact against the bottom surface of the base 20 so that the cap and the base are locked together to create a high strength unitized pedestal for the fingers.

The depth of spiral passage 35 decreases from its entrance region towards its terminal region. The depth at the terminal end of the passage is shallow enough to interfere with the extended end of a protrusion moving therealong. This, in turn, causes the side walls of the cap to be stressed further strengthening and securing the base section in assembly. An indentation 38 is formed in the bottom wall 39 at the end of passage 35 for receiving in seated contact therein a coacting protrusion when the cap is turned to a fully locked position. The depth of the indentation, however, is insufficient to permit the cap from being totally unstressed when in the locked position. Equally spaced openings 45 are provided in the outer side wall of the cap to enable a spanner wrench or the like to engage the cap and thus facilitate locking and unlocking of the cap.

Referring once again to FIG. 1, a draw bolt 50 is arranged to pass through the end cap into the expansion shell so that it can threadably engage a tapered wedge 51, which is of well-known conventional construction. A centrally located threaded opening 46 (FIG. 5) passes through the cap and engages the threaded end of the draw bolt. A plate 53 is located at the head end of the bolt which, although not shown, seats against the mine roof and exerts a compressive force thereagainst as the bolt head 54 is torqued.

As can be seen, in this particular bolt assembly, the cap and wedge are drawn toward each other as the draw bolt is torqued down. This forces the wedge downwardly into deforming contact against the fingers of the expansion shell. The stem section 21 of each shell segment forms the weakest section in the assembly and, as a consequence, only the fingers are caused to expand outwardly in a uniform manner under the influence of the descending wedge to establish a true uniform expansion of the shell. As noted above, the cap 40 functions to lock the thicker base into a single acting unit incapable of shifting axially or radially as the fingers are undergoing expansion.

Referring now to FIG. 2, there is shown another embodiment of the present invention in which like numbers depict like elements as described above in reference to the first embodiment. In this particular arrangement the threaded opening in the end wall 42 of cap 40 is replaced with a more generous clearance hole 58 through which the draw bolt 50 freely passes. An inverted, generally U-shaped, bail 60, of typical construction, is inserted into the shell assembly with the bottom leg 61 of the bail engaging the end of the bolt and horizontally turned arms 62 passing out of the hole 58 in the cap and being seated against the top surface of the cap. As is conventional in this type of assembly, the draw bolt acts between the wedge and the bail to permit the wedge to move down into deforming contact with the shell and thus engage the fingers to be expanded outwardly. Here again, the cap and base section of the segmented shell act in concert to hold the base of the shell unitized during the expansion process.

While this invention has been described with reference to the structure disclosed herein, it is not confined to the details set forth, and this application is intended to cover such modifications or changes as may come within the scope of the following claims.

I claim:

1. an expansion bolt and anchor assembly suitable for use in supporting the roof of a mine shaft including an expansion shell having a base and a number of expandable fingers axially extending from the top surface of the base, said base being formed of a plurality of arcuate shaped sections that abut each other in assembly along radially extended sidewalls, each base section containing a groove in the outer cylindrical wall thereof opening at the bottom of said base section and having a helically aligned passage inclined at an angle whereby the passage slopes upwardly from the bottom towards the top of the base, each sloping passage decreasing in depth from its entrance region towards its terminal end so that the radial distance at the terminal end is brought to a predetermined dimension, and a cylindrical end cap having an anular inner side wall being arranged to pass over the outer wall of the base in assembly in close sliding relationship therewith, said inner sidewall having inwardly extended elements receivable within said grooves formed in the base so that the top end wall of the cap is drawn into seating contact against the bottom surface of the base as the elements move up the sloping passages to securely support the sections of the base in assembly against axial and radial movement, and the extended elements having a radial length so that said elements move into interferring contact with the bottom wall of the sloping passage at the terminal end thereof.

2. The assembly of claim 1 wherein the radially extended sidewalls of each base section has an irregular configuration that compliments that of the next adjacent section abutted therewith so that the sections are further prevented from moving axially in assembly.

3. The assembly of claim 2 wherein said radially extended sidewalls have a sawtooth configuration.

4. The assembly of claim 1 further including a draw bolt passing upwardly through an opening in the top end wall of the cap, and
a tapered wedge threadably engaged by the bolt within the expansion shell for deforming said expandable fingers outwardly.

5. The assembly of claim 4 wherein said opening in the end wall of the cap is threaded to receive the threaded end of the bolt so that the wedge is drawn down into deforming contact against the expandable fingers as said bolt is turned within said cap.

6. The assembly of claim 5 wherein the root section of each finger has a cross-sectional area less than that of the base assembly whereby the fingers deform about said root section as the wedge is drawn down into said shell.

7. The assembly of claim 4 further including a U-shaped strap positioned with the base leg thereof in contact with the threaded end of the bolt and the arms thereof extended downwardly through the opening in the cap and being seated against the outer surface of the end wall of said cap whereby the bolt acts between the strap and the wedge as it is turned to draw the wedge down into deforming contact with said expandable fingers.

8. The assembly of claim 1 further including an indentation in the bottom wall of at least one of said passages at the terminal end thereof for receiving said element therein whereby the cap is locked in place in assembly.

* * * * *